(12) United States Patent
Alario et al.

(10) Patent No.: US 6,218,334 B1
(45) Date of Patent: Apr. 17, 2001

(54) CATALYSTS WHICH CAN BE USED IN CONVERSION REACTIONS OF HYDROCARBONS AND CONTAINING SILICON

(75) Inventors: Fabio Alario, Neuilly-sur Seine; Jean-Marie Deves, Vernouillet; Patrick Euzen, Paris, all of (FR)

(73) Assignee: Institut Francais du Petrole, Rueil Malmaison (FR)

( * ) Notice: Subject to any disclaimer, the term of this patent is extended or adjusted under 35 U.S.C. 154(b) by 0 days.

(21) Appl. No.: 08/973,407

(22) PCT Filed: Jun. 14, 1996

(86) PCT No.: PCT/FR96/00918

§ 371 Date: Dec. 15, 1997

§ 102(e) Date: Dec. 15, 1997

(87) PCT Pub. No.: WO97/00130

PCT Pub. Date: Jan. 3, 1997

(30) Foreign Application Priority Data

| Jun. 16, 1995 | (FR) | 95 07183 |
| Jun. 16, 1995 | (FR) | 95 07185 |
| Jun. 16, 1995 | (FR) | 95 07184 |
| Jun. 16, 1995 | (FR) | 95 07181 |
| Jun. 16, 1995 | (FR) | 95 07187 |
| Jun. 16, 1995 | (FR) | 95 07191 |
| Jun. 16, 1995 | (FR) | 95 07190 |

(51) Int. Cl.[7] ..................................... B01J 27/13
(52) U.S. Cl. ................ 502/226; 502/227; 502/228; 502/230
(58) Field of Search .................. 502/227, 226, 502/228, 230

(56) References Cited

U.S. PATENT DOCUMENTS

| 3,736,252 | * | 5/1973 | Hayes ................................. 208/255 |
| 3,764,557 | * | 10/1973 | Kluksdahl ........................ 502/227 X |
| 3,943,070 | * | 3/1976 | Mitsche ............................ 423/628 X |
| 4,056,489 |   | 11/1977 | Hindin et al. . |
| 4,070,413 |   | 1/1978 | Imai . |
| 4,087,352 | * | 5/1978 | Antos ................................. 208/139 |
| 4,105,590 |   | 8/1978 | Koberstein et al. . |
| 4,152,246 |   | 5/1979 | Weisang et al. . |
| 4,159,257 | * | 6/1979 | Englehard et al. ................. 502/227 |
| 4,401,557 |   | 8/1983 | Juguin et al. . |
| 4,677,094 |   | 6/1987 | Moser et al. . |
| 4,780,447 | * | 10/1988 | Kim et al. ............................ 502/243 |
| 4,963,249 | * | 10/1990 | Baird et al. ......................... 208/139 |
| 5,227,357 |   | 7/1993 | Sun et al. . |
| 5,273,949 |   | 12/1993 | Chopin et al. . |
| 5,739,074 | * | 4/1998 | Kocal et al. ........................ 502/227 |
| 5,922,639 | * | 7/1999 | Alario et al. ....................... 502/330 |

FOREIGN PATENT DOCUMENTS

| 514229 | * | 4/1992 | (EP) . |
| 0 514 229 |  | 11/1992 | (EP) . |
| 661095 | * | 12/1994 | (EP) . |
| 0 661 095 |  | 7/1995 | (EP) . |
| 2 187 887 |  | 1/1974 | (FR) . |
| 2 286 187 |  | 4/1976 | (FR) . |
| 2286187 | * | 4/1976 | (FR) . |
| 2 659 569 |  | 9/1991 | (FR) . |

* cited by examiner

*Primary Examiner*—Stuart Hendrickson
(74) *Attorney, Agent, or Firm*—Oblon, Spivak, McClelland, Maier & Neustadt, P.C.

(57) ABSTRACT

The invention relates to a catalyst comprising:

a matrix consisting of 0 and 100% by weight of λ transition alumina, the complement up to 100% by weight of the matrix being in γ transition alumina, and relative to the total weight of the catalyst, from 0.001 to 2% by weight of silicon, from 0.1 to 15% by weight of at least one halogen chosen from the group formed by fluorine, chlorine, bromine and iodine, from 0.01 to 2% by weight of at least one noble metal from the platinum group, from 0.005 to 10% by weight of at least one promoter metal chosen from the group formed by tin, germanium, indium, gallium, thallium, antimony, lead, rhenium, manganese, chromium, molybdenum and tungsten, and if required from 0.001 to 10% by weight of a doping metal.

55 Claims, No Drawings

CATALYSTS WHICH CAN BE USED IN CONVERSION REACTIONS OF HYDROCARBONS AND CONTAINING SILICON

BACKGROUND OF THE INVENTION

1. Field of the Invention

The present invention relates to catalysts which can be used in conversion reactions for hydrocarbons, in particular in process for reforming gasolines and producing aromatics.

2. Description of the Background

Catalytic reforming is a process which makes it possible to improve the octane number of the oil fractions and in particular of the heavy petroleum from distillation by conversion of n-paraffins and naphthenes into aromatic hydrocarbons.

The operation of catalytic reforming thus consists on the one hand of transforming $C_7$–$C_{10}$ n-paraffins into aromatics and light paraffins and on the other hand $C_7$–$C_{10}$ naphthenes into aromatics and light paraffins. These reactions are illustrated in particular by the conversion by dehydrogenation of cyclohexanes and the dehydroisomerization of alkylcyclopentanes to yield aromatics, methycyclohexane yielding for example toluene, and also by conversion by cyclization of n-paraffins into aromatics, n-heptane for example yielding toluene.

During catalytic reforming, cracking reactions also take place of heavy n-paraffins into light paraffins leading in particular to $C_1$–$C_4$ products essentially of propane and isobutane: these reactions are detrimental to the yield of reformed product.

Finally, there is also the formation of coke through condensation of aromatic nuclei forming a solid product, rich in carbon which is deposited on the catalyst.

The reforming catalysts are very sensitive, apart from coke, to various poisons which can reduce their activity: in particular sulphur, nitrogen, metals and water.

By being deposited on the surface of the catalyst, the coke brings about a loss in activity with time which leads to higher operating temperatures, a lower yield of reformed products, and a higher gas yield.

Because of this and considering the regeneration of the catalyst, the catalytic reforming process can be put into operation in two different ways: in a semi-regenerating or cyclic manner and in a continuous manner. In the first case, the process is carried out with a fixed bed, in the second with a mobile bed.

In the semi-regenerating process, to compensate for the loss of activity of the catalyst, one raises the temperature progressively and then the installation is stopped in order to carry out the regeneration of the catalyst by eliminating the coke. In cyclic reforming which in fact is a variation of the semi-regenerating process, the installation comprises several reactors in series and each is closed down in turn, the coke deposits are eliminated from the catalyst out of action and the catalyst regenerated while the other reactors continue to operate.

In continuous reforming, the reactors put into operation are mobile-bed reactors operating at low pressure (less than 15 bars), which makes it possible to raise considerably the yields of reformed product and hydrogen by encouraging aromatization reactions instead of cracking, but on the other hand the formation of coke is greatly accelerated. The catalyst passes through the reactors then a regenerating action.

The processes for production of aromatics imply conversion reactions of the paraffinic and naphthenic hydrocarbons into aromatic compounds.

In these hydrocarbon conversion processes, there are generally used bi-functional catalysts containing, for example, platinum and a support of chlorinated alumina, which associate the acidic function of the chlorinated alumina necessary for the reactions of isomerization of cyclopentanic naphthenes and the cyclization of paraffins with the dehydrogenating function of the platinum necessary for the dehydrogenation reactions. Catalysts of this type, also including another metal such as rhenium, tin or lead, are described in US-A-3 700 588 and US-A-3 415 737.

As can be seen from the above, the catalytic reforming processes can be carried either by using a fixed bed or a mobile bed of catalyst.

In each case, the catalyst undergoes a regenerating treatment operating at high temperature and in the presence of steam, which consists among other things of burning off the coke deposited on the catalyst. Unfortunately, these treatment conditions favour degradation of the catalyst. It is thus important to try to raise the resistance of the catalyst under these conditions.

Generally the catalyst is presented in the form of extrusions or balls of a sufficient size to let the reagents and gaseous products pass relatively easily. Wear of the catalyst results, in particular through friction in processes with mobile beds, which provokes the formation of dusts and finer grains. These very fine grains perturb the gaseous flow and require raising the entry pressure of the reagents and even, in certain cases, to stop the unit. In mobile bed units, this progressive wear also has the consequence of perturbing the circulation of the catalyst and makes it necessary to top up the catalyst frequently.

A catalyst like a reforming catalyst must thus satisfy a great number of requirements, certain of which may appear contradictory. This catalyst must first of all provide the greatest activity possible allowing high yields to be obtained, but this activity must also be conjugated with the greatest selectivity possible, that is to say that cracking reactions leading to light products containing from 1 to 4 carbon atoms must be limited.

In addition, the catalyst must be highly stable vis-a-vis its deactivation through coke deposit; the catalyst must also have excellent resistance to degradation when it is submitted to the extreme conditions existing in the repeated regenerating operations it has to undergo.

In the case of the continuous reforming process operating for mobile bed reactors and as mentioned above, the catalysts are also submitted to intense and progressive wear through friction, which leads to a considerable diminution of their specific surface area and the formation of "smalls" which prejudice the functioning of the installation. The catalysts available at present, even if they can fulfill one or several of these conditions, do not satisfy the whole range of the requirements mentioned above.

Also, despite the many improvements already made to the bi-functional catalysts used, there is still a need for new catalysts offering improved performance, not only as far as the yield of conversion reactions is concerned, but also the lifespan of the catalyst.

SUMMARY OF THE INVENTION

The present invention concerns precisely a multi-functional catalyst which presents improved catalytic performance and an extended lifespan in reactions of reforming and production of aromatics.

According to the invention, the catalyst comprises:
- a matrix constituted of 0 to 100% by weight of λ transition alumina, the complement to 100% by weight of the matrix being γ transition alumina, and compared with the total weight of the catalyst,
- from 0.001 to 2% by weight of silicon,
- from 0.1 to 15% by weight of at least one halogen chosen from among the group formed by fluorine, chlorine, bromine and iodine,
- from 0.01 to 2% by weight of at least one noble metal of the platinum group,
- from 0.005 to 10% by weight of at least one promoter metal chosen from the group formed by tin, germanium, indium, gallium, thallium, antimony, lead, rhenium, manganese, chromium, molybdenum and tungsten, and it has undergone a complementary hydrothermal treatment, at a temperature from 300 to 1000° C., in a gaseous atmosphere containing steam.

DETAILED DESCRIPTION OF THE INVENTION

In one embodiment of the invention, the catalyst comprises in addition from 0.001 to 10% by weight of at least one doping metal chosen from the group constituted of the alkali and alkaline-earth metals, the lanthanides, titanium, zirconium, hafnium, cobalt, nickel and zinc.

It is to be noted that in the continuation of this text all the contents of silicon, halogen, noble metal, promoter metal and doping metal are expressed in weight % compared to the total weight of the catalyst, unless indicated to the contrary. Moreover, these content levels correspond to the total content of constituent (doping metal, halogen, noble metal or promoter metal) when the constituent comprises several elements (halogens or metals).

In the invention, the application of a complementary hydrothermal treatment of the catalyst is very important. In fact, in the catalysts of the invention, it has been noted that the presence of silicon preserves the matrix in alumina(s) of the catalyst from a loss of specific surface area when it is submitted to the regeneration treatments necessary for its operation in conversion reactions of hydrocarbons, but the catalyst with silicon has the disadvantage of producing a high degree of cracking. In unexpected fashion, the applicant has noted that every complementary hydrothermal treatment in the presence of water applied to this type of catalyst has the effect of preserving the loss of specific surface area, while also improving catalytic performance (less cracking).

Preferably, this complementary hydrothermal treatment is carried out in a gaseous atmosphere containing not only steam but also a halogen such as chlorine.

A preferred catalyst of the invention comprises:
- a support constituted of a matrix of γ alumina, of λ alumina or of a mixture of γ alumina and λ alumina plus silicon.
- at least one halogen,
- a catalytic metal ensuring the function of dehydrogenation of the catalyst, constituted of one or several noble metals of the platinum group, and
- at least one promoter metal chosen from among the metals cited above.

In the invention the matrix is a base of a hydrated oxide of aluminium. It is known that supports in alumina of the general-formula $Al_2O_3$, $nH_2O$, where n goes from 0 to 0.6, which present a specific surface area of 150 to 400 $m^2$/gm, can be obtained by controlled dehydration of amorphous aluminium hydroxides where n has a value of between 1 and 3. The original amorphous hydroxides can exist under several forms and the most common are boehmite (n=1) gibbsite and bayerite (n=3), and they can lead during dehydration treatment to several transition oxides or aluminas such as the forms ρ, γ, λ, χ, θ,δ,κ, and α which are differentiated essentially by the organization of their crystalline structure. During thermal treatments, these different forms are susceptible to evolution between themselves, following a complex relationship which depends on the operating conditions of the treatment. The a form which presents a specific surface area and acidity which are nearly zero, is the most stable at high temperatures. For reforming catalysts, the γ form of transition alumina is used most often, because of the compromise it offers between its properties of acidity and thermal stability.

In the invention, γ transition alumina, λ transition alumina or preferably a mixture of γ transition alumina and λ transition alumina is used.

λ transition alumina can be obtained by roasting bayerite in dry air, at atmospheric pressure, between 250 and 500° C., preferably between 300 and 450° C. The specific surface area achieved which depends on the final temperature of roasting, is between 300 and 500 $m^2$/gm. The γ alumina comes from boehmite through roasting under air at a temperature between 450 and 600° C. The specific surface area of the γ alumina obtained is between 100 and 300 $m^2$/gm.

These two transition aluminas have crystalline structures which are close but distinctive. The technique of X-ray diffraction can, in particular, differentiate between them. Their structures are of the spinel type with faults, and their networks are slightly distant from cubic symmetry. This quadratic deformation is minimal for the λ form and is much clearer for γ alumina whose unit-cell parameters are as follows: a=b=7.95 Å and c=7.79 Å.

According to the invention, when using a mixture of γ transition alumina and λ transition alumina, this mixture can comprise from 0.1 to 99% or rather from 1 to 84% by weight of λ alumina. Preferably, this mixture comprises 3 to 70% by weight, and even better 5 to 50% by weight of λ transition alumina, the complement to reach 100% by weight of the mixture being γ transition alumina.

According to the invention, the alumina matrix is modified by silicon.

The content of silicon of the catalyst is between 0.001 to 2% by weight, preferably 0.01 to 1% by weight.

The halogen or halogens used to acidify the support can represent a total of 0.1 to 15% by weight, and preferably 0.2 to 10% by weight. Preferably, a single halogen is used, in particular chlorine.

The catalyst also comprises one or several promoter metals which have the effect of promoting the dehydrogenation activity of the noble metal of the platinum group and of limiting the dispersion loss of the atoms of the noble metal from the support surface, which is partly responsible for the deactivation of the catalyst.

The total content of promoter metals is 0.005 to 10% by weight, preferably 0.01 to 1% by weight.

The promoter metals are chosen in function of the method of utilization of the catalyst.

Thus, when the catalyst is to be used in a fixed bed process, the promoter metal is chosen preferably from the group constituted by rhenium, manganese, chromium, molybdenum, tungsten, indium and thallium.

When the catalyst is to be used in a mobile bed process, the promoter metal is chosen preferably from the group constituted by tin, germanium, indium, antimony, lead, thallium and gallium.

Among these, rhenium is preferred for fixed bed processes and tin for mobile bed processes, since they produce the best promoter effects on the catalyst activity.

In particular, rhenium increases the stability of the catalyst vis-à-vis its deactivation by coke deposits. Thus, preferably, rhenium is used in catalysts for fixed bed units since this added stability makes it possible to lengthen the reactive cycles between two catalyst regenerations.

As far as tin is concerned, this makes it possible to improve the performance of catalysts when they are used at low pressure. This improvement together with the lower cracking activity of catalysts using tin permits improved yields of reformed product, above all in continuous regeneration processes on mobile beds functioning at low operating pressure.

The total promoter metal content is from 0.005 to 10% by weight, preferably 0.01 to 1% by weight.

When the catalyst only contains a single promoter metal, for example rhenium or tin, it is preferably present at 0.005 to 0.9% by weight or, even better, at 0.01 to 0.8% by weight.

The catalyst according to the invention comprises as well at least one noble metal of the platinum group, 0.01 to 2% by weight, and preferably 0.1 to 0.8% by weight.

The noble metals which can be used are platinum, palladium, iridium; platinum is to be preferred.

According to one embodiment of the invention, the catalyst comprises in addition 0.001 to 10% by weight of at least one doping metal chosen from the group constituted by the alkali and alkaline-earth metals, lanthanides, titanium, zirconium, hafnium, cobalt, nickel and zinc.

In this case, the alumina matrix is modified with silicon and one or several doping metals.

Preferably, the doping metals belong to just one of the following groups:

1)—the group of alkali and alkaline-earth metals,
2)—the group of lanthanides, and
3)—the group comprising titanium, zirconium, hafnium, cobalt, nickel and zinc.

In the case of metals belonging to the first group (alkali and alkaline-earth metals) the total content of doping metal of the catalyst is generally 0.001 to 8% by weight.

The alkali metals used can be lithium, sodium, potassium, rubidium and caesium; the alkaline-earth metals can be chosen from among beryllium, magnesium, calcium, strontium and barium.

The content of doping metal of the first group is chosen in particular depending on the reactor in which the catalyst of the invention will be used.

Thus, in the case of a fixed bed reactor, the content of doping metal of the catalyst is generally within the range of 0.001 to 0.3%, and preferably between 0.005 and 0.3% or even better 0.01 and 0.3% by weight.

In the case of a reactor with mobile bed, the content of doping metal of the catalyst is higher, generally from more than 0.3 to 8%, preferably more than 0.3 to 4% and even better 0.7 to 4% by weight.

Preferably, the doping metal is an alkali metal such as potassium.

In the case of doping metals belonging to the second group (lanthanides), the total content of doping metal of the catalyst can be from 0.001 to 10% by weight.

The group of lanthanides or rare earths is comprised of the elements of the lanthanum group in the Mendeleev periodic table and whose atomic numbers are between 57 and 71, for example lanthanum, cerium, neodymium and praseodymium.

The total content of doping metal of the second group is chosen in particular depending on the reactor in which the catalyst will be used.

Thus, it can be preferably between 0.001 to 0.5% and even better 0.01 to 0.5% by weight when the catalyst is used in a fixed bed process. Preferably, it is from more than 0.5 to 10%, or even better from more than 0.5 to 4% by weight when the catalyst is used in a mobile bed process.

In the case of doping metals belonging to the third group (Ti, Zr, Hf, Co, Ni, Zn), the total content of doping metal of the catalyst can be from 0.001 to 10% by weight.

It can also be chosen in function of the reactor in which the catalyst is to be used.

Thus, the total content of doping metal of the third group is, preferably, from 0.001 to 0.7% and even better from 0.01 to 0.7% by weight when the catalyst is used in a fixed bed process. Preferably, it is more than 0.7 to 10% and even better more than 0.7 to 4% by weight when the catalyst is used in a mobile bed process.

The catalyst of the invention can be prepared by depositing its different constituents on the alumina matrix. The deposit of each constituent can be carried out totally or partially on one or both of the two aluminas of the matrix before or after it is formed. The constituents can be deposited separately or simultaneously in any order.

Thus, when a mixture of aluminas is used as the matrix, the constituents of the catalyst can be deposited on the two aluminas or on one of them, preferably the λ alumina, before carrying out the mixture of the two aluminas and forming them.

It is also possible to deposit one or certain constituents partly or totally on the two aluminas or one of them before mixing them, then carry out the other deposits after mixing of the two aluminas, either before or after the forming of the mixture. When one or several constituents is (are) deposited before mixing the two aluminas, silicon is preferably deposited on the transition alumina.

However, according to the invention, it is generally preferred to mix the two aluminas before depositing the metallic constituents and the halogen(s).

The invention also concerns a process for preparing the catalyst of the invention, which comprises the following stages:

a) eventual preparation by mixing and then by forming of a matrix in γ transition alumina, in λ transition alumina, or in a mixture of λ transition alumina and γ transition alumina.

b) deposit on at least one of the γ and λ transition aluminas of one of the following constituents, in the weight percentages given below, which refer to the total weight of the catalyst;

from 0.001 to 2% by weight, preferably from 0.01 to 1% by weight, of silicon, from 0.1 to 15%, preferably 0.2 to 10% by weight of at least one halogen chosen from the group constituted by fluorine, chlorine, bromine and iodine, from 0.01 to 2% of at least one noble metal of the platinum group, and from 0.005 to 10% by weight of at least one promoter metal chosen from the group constituted by tin, germanium, indium, gallium, thallium, antimony, lead, rhenium, manganese, chromium, molybdenum and tungsten, from 0.001 to 10% by weight if required of at least one doping metal chosen from the group constituted by the alkali and alkaline-earth metals, lanthanides, titanium, zirconium, hafnium, cobalt, nickel and zinc.

Stages a) and b) can be carried out in any order and the deposits of stage b) can be only partly carried out before stage a) and can be carried out in any order; and c) complementary hydrothermal treatment of the catalyst obtained after stages a) and b), at a temperature between 300 and 1000° C., in a gaseous atmosphere containing steam.

In a preferred embodiment of this process, a support formed from the matrix of alumina and silicon is first prepared, then the doping metal or metals is or are deposited thereon, the promoter metal or metals, the halogen or halogens, and the noble metal or metals of the platinum group.

In this case, silicon can be deposited on the alumina or the mixture of aluminas, before or after forming.

Preferably, the silicon is deposited after the forming of the alumina matrix.

Also, the invention relates to the support obtained in the first stage of this preferred process, which is constituted of a matrix comprising 0 to 100% by weight of λ transition alumina, the complement making up the 100% by weight of the matrix being γ transition alumina, and silicon, the quantity of silicon being from 0.001 and 2.7% and preferably from 0.01 to 1.35% by weight of silicon compared with the weight of the support.

The deposit of the different constituents of the catalyst can be carried out by classical techniques, in liquid or gaseous phase, starting from the appropriate precursor components. When the deposit is made on the alumina matrix which is already formed, the techniques employed can for example be dry impregnation, impregnation through excess solution or ionic-exchange. This operation is followed if necessary by drying and roasting at a--temperature-between 300 and 900° C., preferably in the presence of oxygen.

Thus, the silicon can be deposited from components such as the alkyl tetraorthosilicates, the silicon alkoxides, the quaternary ammonium silicates, the silanes, the disilanes, the silicones, the siloxanes, the silicon halides, the halogenosilicates and silicon in the form of micro-balls of colloidal silica. In the case where the precursor of silicon is a fluorosilicate, this can be expressed by the formula $M_2/xSiF_6$, where M is a metallic or non-metallic cation with valency x, chosen from among the following cations: $NH_4^+$, ammonium alkyls, $K^+$, $Na^+$, $Li^+$, $Ba^{2+}$, $Mg^{2+}$, $Cd^{2+}$, $Cu+$, $Cu^{2+}$, $Ca^{2+}$, $Cs^+$, $Fe^{2+}$, $Co^{2+}$, $Pb^{2+}$, $Mn^{2+}$, $Rb^+$, $Ag^+$, $Sr^{2+}$, $Zn^{2+}$, $Tl^+$ and $H^+$.

When the silicon is deposited after the forming of the alumina matrix, this deposit is preferably carried out by impregnation in a water medium by using an excess of aqueous solution of the precursor Then the impregnation solvent is eliminated, for example by drying and air roasting is carried out, at a temperature for example between 300 and 900° C.

The deposit of the doping metal or metals of the first group chosen from among the alkali and alkaline-earth metals can be carried out by any technique and can take place at any stage of the preparation process of the catalyst. When the deposit is made after the forming of the matrix of alumina, it is preferable to use impregnation in an aqueous medium by excess of solution, followed by drying to eliminate the impregnation solvent and roasting in air at a temperature between for example 300 and 900° C.

The precursor components used can be for example salts of the alkali and alkaline-earth metals such as halides, nitrates, carbonates, acetates, sulphates, cyanides and oxalates.

The deposit of doping metal or metals of the second group (lanthanides) can be carried out using any technique known to the state of the art, and can take place at any moment of the preparation of the catalyst. For example, when this element of the group of the lanthanides or rare earths is deposited after forming the alumina or aluminas containing other metals, if required, dry impregnation, impregnation through excess of solution or ionic exchange can be used. On a matrix which has already been formed, a preferred method for the introduction of this additional element is impregnation in an aqueous medium by using an excess of solution. In order to eliminate the impregnation solvent, this impregnation is followed by drying and roasting in air at a temperature between, for example, 300 and 900° C.

The precursor components can be, for example, halides, nitrates, carbonates, acetates, sulphates or oxalates of said elements.

The deposit of doping metal or metals of the third group composed of titanium, zirconium, hafnium, cobalt, nickel and zinc on the matrix of the catalyst used in the present invention, can be carried out according to all the state of the art techniques, and can occur at any moment during the preparation of the catalyst. For example, when this element is deposited after forming of alumina or aluminas containing, if required, other metals, dry impregnation, impregnation through excess solution, or ionic exchange can be used. On a matrix which is already formed, a preferred method for introducing this additional element is impregnation in an aqueous medium by using an excess of solution. In order to eliminate the impregnation solvent, this impregnation is followed by drying and roasting in air at a temperature of between, for example, 300 and 900° C.

The deposits of silicon and at least one element chosen from the group constituted by titanium, zirconium, hafnium, cobalt, nickel and zinc can be carried out independently from each other, either on a transition alumina or on the non-formed matrix, said matrix comprising between 0 and 99% by weight of λ transition alumina and the complement up to 100% of γ transition alumina, or yet again on the preformed matrix, the latter being the preferred method.

The deposit of a noble metal or metals of the platinum group can also be carried out by classical techniques, in particular impregnation from an aqueous solution or not containing a salt or compound of the noble metal. As an example of salts or compounds which can be used, chloroplatinic acid, ammoniated compounds, ammonium chloroplatinate, platinum dicarbonyl dichloride, hexahydroxyplatinic acid, palladium chloride and palladium nitrate may be mentioned.

In the case of platinum, the ammoniated compounds can be for example the salts of platinum IV hexamines of formula $Pt(NH_3)_6X_4$, the salts of platinum IV halogenopentamines of formula $(PtX(NH_3)_5)X_3$, the salts of platinum tetrahalogenodiamines of formula $PtX_4(NH_3)_2X$, the complexes of platinum with halogens- polyketones and the halogen compounds of formula $H\,(Pt\,(aca)_2X)$ in which the element X is a halogen chosen from the group comprising chorine, fluorine, bromine and iodine, and preferably chlorine, and the aca group represents the rest of the formula $C_5H_7O_2$ derived from acetylacetone. The introduction of the noble metal of the platinum group is preferably carried out by impregnation using an aqueous or organic solution of one of the organometallic compounds cited above. Among the organic solvents which can be used, the paraffin, naphthene or aromatic hydrocarbons may be mentioned, and the halogenated organic compounds with for example 1 to 12 carbon atoms per molecule. For example n-heptane, methylcyclohexane, toluene and chloroform can be mentioned. Solvent mixtures may also be used.

After introduction of the noble metal, drying and roasting is preferably carried out, for example, at a temperature of between 400 and 700° C.

The depositing of a noble metal or noble metals of the platinum group can be made at any time during the preparation of the catalyst. It can be carried out in isolation or simultaneously with the depositing of other constituents, for example of the promoter metal or metals. In this latter case, a solution containing all the constituents to be introduced simultaneously may be used for impregnation.

The deposit of the promoter metal or metals can also be carried out by classical techniques beginning from precursor compounds such as the halogens, nitrates, acetates, tartrates, citrates, carbonates and the oxalates of these metals. Any other salt or oxide of these metals which is soluble in water, acids, or in another appropriate solvent, is also suitable as a precursor. As examples of such precursors, mention can be made of the rhenates, chromates, molybdates and tungstates. The promoter metal or metals can also be introduced in the mixture in an aqueous solution of their precursor compound (s) with the alumina or aluminas before formation, followed by roasting in air at a temperature between 400 and 900° C.

The introduction of promoter metal or metals can also be carried out with the aid of a solution of an organometallic compound of said metals in an organic solvent. In this case, this deposit is preferably carried out after that of the noble metal(s) of the platinum group and roasting of the solid, followed if required by reduction with hydrogen at high temperature, for example between 300 and 500° C. The organometallic compounds are chosen in the group constituted by the complexes of said promoter metal, in particular the polyketone complexes and the hydrocarbylmetals such as the alkyl, cycloalkyl, aryl, alkylaryl and arylalkyl metals. Organohalogen compounds may also be used. Mention can be made in particular of tin tetrabutyl in the case where the promoter metal is tin, lead tetraethyl in the case where the promoter metal is lead and indium triphenyl in the case where the promoter metal is indium. The impregnation solvent can be chosen from the group constituted by the paraffinic, naphthenic or aromatic hydrocarbons containing from 6 to 12 carbon atoms per molecule and the halogen organic compounds containing 1 to 12 atoms of carbon per molecule. Mention can be made for example, of n-heptane, methylcyclohexane and chloroform. Mixtures of the solvents defined above can also be used.

The halogen, for example chlorine, can be introduced into the catalyst at the same time as another metallic constituent, for example in the cases where a halide is used as precursor compound of the metal of the platinum group, of the promoter metal or of the alkali or alkaline-earth metal. This introduction can also be carried out through impregnation of the support by means of an aqueous solution containing an acid or a halogenated salt. For example, chlorine can be deposited by using a solution of hydrochloric acid. The introduction of chlorine can also be carried out by roasting of the catalyst at a temperature between for example 400 and 900° C., in the presence of an organic compound containing the halogen, such as for example $CCl_4$, $CH_2Cl_2$ and $CH_3Cl$.

Of course, at least two constituents of the catalyst can be introduced simultaneously, for example from a solution containing their precursor compounds.

The constituents can also be introduced successively, from separate solutions, in any order. In this latter case, intermediary drying and/or roasting can be carried out.

The formation of the alumina matrix can be carried out using state of the art techniques for formation of catalysts such as, for example, extrusion, drip coagulation, coating, drying by atomization or pelleting.

In the preferred embodiment, the preparation process is characterized in that it comprises the is following successive stages:

a) formation of the matrix of $\gamma$ alumina or $\lambda$ alumina or of a mixture of $\gamma$ alumina and $\lambda$ alumina, b) deposit of silicon on this matrix, c) possible deposit of at least one doping metal, and d) simultaneous or successive deposit
   of at least one promoter metal chosen from among tin, germanium, indium, gallium, thallium, antimony, lead, rhenium, manganese, chromium, molybdenum and tungsten;
   of at least one element chosen from the group constituted by fluorine, chlorine, bromine, iodine, and
   of at least one noble metal of the platinum group.

After formation of the matrix and deposit of all the constituents, a final thermal treatment can be carried out between 300 and 1000° C.; which can comprise only a single stage preferably at a temperature between 400 and 900° C., and in an atmosphere containing oxygen, preferably in the presence of free oxygen or air. This treatment generally corresponds to drying-roasting following the deposit of the last constituent.

After formation of the matrix and deposit of all the constituents, the complementary hydrothermal treatment is carried out at a temperature between 300 and 1000° C. and preferably 400 to 700° C., in a gaseous atmosphere containing steam and, if required, a halogen such as chlorine.

This treatment can be carried out on a bed crossed by a current of gas or in a static atmosphere. Preferably, the gaseous atmosphere contains water and if required at least one halogen. The molar content in water is from 0.05 to 100%, preferably 1 to 50%. The molar content of halogen is 0 to 20%, and preferably between 0 and 10%, and preferably again between 0 and 2%. The duration of treatment is variable depending on the conditions of temperature, partial water pressure and quantity of catalyst. Advantageously, this value is between one minute and 30 hours, preferably between 1 and 10 hours. The gaseous atmosphere used is for example based on air, oxygen, or an inert gas such as argon or nitrogen.

The role of this high-temperature treatment in the presence of water is important. As described in the examples given below, in the presence of silicon which preserves the matrix in alumina(s) from a loss of specific surface area during the different regenerating treatments, in an unexpected fashion, harsh thermal treatment in the presence of water applied to this type of catalyst has the effect of preserving it from a loss of specific surface area, while still improving the catalytic performance.

After the final thermal treatment, the catalyst can be subjected to an activation treatment under hydrogen at high temperature, for example at a temperature between 300 and 550° C.

The process for treatment under hydrogen consists for example of raising the temperature slowly in a current of hydrogen until the maximum reduction temperature is reached, generally between 300 and 550° C. and preferably between 350 and 450° C., followed by maintenance at this temperature for a period which generally lasts between 1 and 6 hours.

The catalyst of the invention can be used in particular in reactions for conversion of hydrocarbons, and more particularly in the processes of reforming of gasolines and production of aromatics.

The reforming processes make it possible to raise the octane number of the gasoline fractions from the distillation of crude oil and/or other refining processes.

The processes for production of aromatics provide the bases (benzene, toluene and xylene) which can be used in petrochemistry These processes have a supplementary interest in that they contribute to the production of large quantities of hydrogen which are indispensable for the hydrotreatment, processes of the refinery.

These two processes differ through the choice of operating conditions and the composition of the load.

The typical load treated by these processes contains paraffinic, naphthenic and aromatic hydrocarbons containing 5 to 12 atoms of carbon per molecule. This load is defined, among other things, by its density and its composition by weight.

In order to activate these processes, the hydrocarbon load is placed in contact with the catalyst of the present invention, at a temperature of 400 to 700° C., using the mobile bed or fixed bed technique.

Generally the mass flow of the charge treated per unit mass of the catalyst is between 0.1 and 10 kg/kg.hr. The operating pressure can be fixed between atmospheric pressure and 4 MPa.

A part of the hydrogen produced is recycled according to a molar recycling content of between 0.1 and 8. This content is the molar relation of the flow of hydrogen recycled over the mass flow of load.

Other features and advantages of the invention will become clearer when reading the examples which follow, it being understood that the data given are illustrative and non-restrictive.

EXAMPLE 1

This example illustrates the production of a catalyst comprising a matrix formed of a mixture of γ alumina and λ alumina, on which silicon, chlorine, tin and platinum are deposited.

a) Formation of the Alumina Matrix

First of all, the alumina matrix is prepared by mixing a powder of γ alumina of a specific surface area of 220 m$^2$/gm and a powder of λ alumina with a specific surface area equal to 320 m$^2$/gm which has been prepared by roasting of bayerite. The proportion of λ alumina is 10% by weight. This mixture is then formed by extrusion, then roasted in a current of dry air at 520° C. for 3 hours.

b) Deposit of Silicon

After cooling down, silicon is deposited on the roasted matrix by placing it into contact with an ethanolic solution of tetraethyl orthosilicate (Si(OC$_2$H$_5$)$_4$. The concentration of this solution is 18.5 gm of silicon per liter. This contact is made at ambient temperature with stirring, for 2 hours. The solvent is then evaporated under reduced pressure. Then the impregnated extrusions are dried at 120° C. for 15 hours, and roasted at 530° C. in a current of dry air for 2 hours. One thus obtains a support conforming to the invention.

c) Deposit of Platinum, Tin and Chlorine

Next, platinum, tin and chlorine are simultaneously deposited on the support by impregnation with an aqueous chlorinated solution containing per liter:

0.81gm of platinum under the form H$_2$PtCl$_6$, and 0.96gm of tin under the form SnCl$_2$.

The solution is left in contact with the support for 2 hours. After centrifugation and drying for 4 hours at 120° C., the impregnated support is roasted at 530° C. for 3 hours in a current of dry air.

d) Hydrothermal Treatment

A hydrothermal treatment is then carried out in the presence of water and chlorine. To do so, the catalyst is treated at 510° C. for 2 hours in a current of 2000 dm$^3$/hr of air for 1 kg of solid product. This air contains water and chlorine injected in a preheating zone situated upstream from the bed of solid. The molar concentrations in water and chlorine are equal to 1% and 0.05% respectively.

The specifications of the catalyst obtained are given in table 1.

EXAMPLE 2

The same operating mode as in example 1 is followed in order to prepare a catalyst comprising the same constituents, except that the hydrothermal treatment of stage d) is not performed.

The specifications of the catalyst obtained are also given in table 1.

COMPARATIVE EXAMPLE 1

In this example, the same operating mode as in example 1 is followed but in stage a) only γ alumina is used, and stage b) for depositing silicon and stage d) for hydrothermal treatment are not performed.

The specifications of the catalyst obtained are also given in table 1.

TABLE 1

| Catalyst | Proportion η alumina (weight % in the matrix) | Specific surface area (m$^2$/gm) | Platinum content (weight %) | Tin content (weight %) | Chlorine content (weight %) | Silicon content (weight %) |
|---|---|---|---|---|---|---|
| Example 1 | 10 | 227 | 0.25 | 0.17 | 1.08 | 1.04 |
| Example 2 | 10 | 228 | 0.24 | 0.18 | 1.13 | 1.02 |
| Comparative Example 1 | 0 | 219 | 0.23 | 0.18 | 1.15 | 0 |

EXAMPLE 3

In this example, the catalysts of examples 1 and 2 and of the comparative example, are tested for conversion of a load of hydrocarbons with the following specifications:

| | |
|---|---|
| volume mass at 20° C. | 0.736 kg/dm$^3$ |
| octane number required | ~38 |
| content of paraffins | 54.8% by weight |
| content of naphthenes | 33.1% by weight |
| content of aromatics | 12.1% by weight |

The following operating conditions are used:

| | |
|---|---|
| temperature | 500° C. |
| total pressure | 1.0 Mpa |
| mass flow of load | 1.8 kg/kg of catalyst |
| duration | 100 hr. |
| total pressure | 1/0 MPa |
| throughput of load | 1.8 kg/kg of catalyst |
| duration | 100 hours |

At the end of the operating period, the deactivated catalyst is regenerated by controlled combustion of the coke and adjustment of its chlorine content to about 1.10% by weight. The specific surface of the support is measured after this regeneration. Then, after activation of the catalyst at high temperature by hydrogen, the load is injected for a new period of operation. In this way, each catalyst has been subjected to 5 operation/regeneration cycles. the specific surfaces corresponding to the start of the first and of the last cycle and the performance obtained after 15 hours of operation in each of these two cycles are reported in Table 2 below. reformed product. It is also noted that these improvements are achieved without the yields of reformed-product being affected.

If the evolution over 5 cycles is now considered, it can be seen that the lowering of the specific surface areas of examples 1 and 2 is much less than that of the prior art catalyst. This smaller fall is accompanied by greater stability of yields in aromatics and of octane numbers.

The catalysts of the invention thus make it possible to obtain, in a stable way over several cycles, better octane numbers for unchanged yields of reformed product.

EXAMPLE 4

This example illustrates the production of a catalyst comprising a matrix formed of a mixture or γ alumina and λ alumina, on which silicon, chlorine, potassium, rhenium and platinum are deposited.

a) Formation of the Matrix in Alumina

The alumina matrix is first prepared by mechanically mixing a powder of γ alumina of specific surface area of 220 m$^2$/gm and a powder of λ alumina of specific surface area equal to 320 m$^2$/gm which has been prepared by roasting of bayerite. The λ alumina proportion is 30% by weight. This mixture is then formed by extrusion, and roasted in a current of dry air at 520° C. for 3 hours.

b) Deposit of Silicon

After cooling down, silicon is deposited on the roasted matrix by placing it into contact with an ethanolic solution of tetraethyl orthosilicate Si(OC$_2$H$_5$)$_4$. The concentration of this solution is 2.5 gm of silicon per liter. This contact is made at room temperature with stirring, for 2 hours. The solvent is then evaporated under reduced pressure. Then the impregnated extrusions are dried at 120° C. for 15 hours, and roasted at 530° C. in a current of dry air for 2 hours.

c) Potassium Deposit

Then the extrusions are put into contact with an aqueous solution of potassium carbonate K$_2$CO$_3$ containing 12.8 gm/l of potassium. This contact is carried out at ambient temperature for 1 hour, and then the impregnated matrix is dried at 120° C. over 15 hours and roasted at 530° C. in a current of dry air for 2 hours.

d) Deposit of Platinum and Chlorine

The platinum and part of the chlorine are then deposited simultaneously on this support through impregnation by a chlorinated aqueous solution containing per liter:

8.20 gm of chlorine in the form of HCl, and 1.00 gm of platinum in the form of H$_2$PtCl$_6$. The solution is left in contact with the support for 2 hours. After centrifugation and drying for 4 hours at 120° C., the impregnated support is roasted at 530° C. for 3 hours in a current of dry air e) Deposit of Rhenium and Chlorine

Then, the rhenium and the rest of the chlorine are simultaneously deposited through impregnation by a chlorinated aqueous solution containing per liter:

4.20 gm of chlorine in the form of HCl, and 1.50 gm of rhenium in the form of ReCl$_3$.

After drying, the impregnated support is roasted at 530° C. for 2 hours in a current of dry air.

f) Hydrothermal Treatment

Then a hydrothermal treatment in the presence of water and chlorine is carried out. To do so, the catalyst is treated at 510° C. for 2 hours in a current of air of 2000 dm$^3$/hr for 1 kg of solid product. This air contains water and chlorine injected in a preheating zone situated upstream from the bed of solid. The molar concentrations in water and chlorine are equal to 1% and 0.05% respectively.

The specifications of the catalyst obtained are given in table 3.

EXAMPLE 5

The same operating mode as in example 4 is followed to prepare a catalyst comprising the same constituents, apart from the fact that in stage c), the impregnation solution contains 6.4 gm/l of potassium, and the hydrothermal treatment of stage e) is not carry out.

The specifications of the catalyst obtained are also given in table 3.

COMPARATIVE EXAMPLE 2

In this example, the same operating mode as in example 4 is followed but only γ alumina is used in stage a), and stages b) and c) for depositing silicon and potassium and stage f) for hydrothermal treatment are not carried out.

The specifications of the catalyst obtained are also given in table 3.

EXAMPLE 6

This example illustrates the production of a catalyst comprising a matrix formed from a mixture of γ alumina and λ alumina comprising 8% of λ alumina, on which silicon, chlorine, potassium, tin and platinum are deposited.

For this preparation, the same operating mode as in example 4 is followed, utilizing in stage a) 8% by weight of λ=0 alumina and, instead of stages d) and e), carrying out a single simultaneous deposit stage of platinum, tin and chlorine through impregnation with a chlorinated aqueous solution containing per liter:

0.81gm of platinum in the form H$_2$PtCl$_6$, and 0.96gm of tin in the form SnCl$_2$.

The solution is left in contact with the support for 2 hours. After centrifugation and drying for 4 hours at 120° C., the impregnated support is roasted at 530° C. for 3 hours in a current of dry air A hydrothermal treatment in the presence of water and chlorine is then carried out, as in stage f) of example 4.

The specifications of the catalyst obtained are given in table 3.

EXAMPLE 7

The same operating mode as in example 6 is s followed to prepare a catalyst comprising the same constituents, apart from the fact that, in stage c), the impregnation solution contains 6.4 gm/l of potassium, and the final hydrothermal treatment in the presence of water and chlorine is not carried out.

The specifications of the catalyst obtained are also given in table 3.

COMPARATIVE EXAMPLE 3

In this example, the same operating mode as in example 6 is followed, but only γ alumina is used in is stage a), and stages b) and c) for depositing silicon and potassium and the last stage f) :-or hydrothermal treatment in the presence of water and chlorine as described in example 1 are not carried out.

The specifications of the catalyst obtained are also given in table 3.

TABLE 4

| Catalyst | Yield of reformed product (weight %) | Hydrogen yield (weight %) | Aromatics yield (weight %) | C4 yield (weight %) | C4 aromatics |
|---|---|---|---|---|---|
| Example 4 | 85.1 | 3.2 | 60.2 | 11.7 | 0.19 |
| Example 5 | 84.7 | 3.3 | 60.8 | 12.0 | 0.20 |
| Comparative example 2 | 83.9 | 3.0 | 60.0 | 13.1 | 0.22 |

When comparing the performances of the catalysts of example 4 and the comparative example 2 on the one hand, and those of the catalysts of example 5 is and of the comparative example 2 on the other, it can be noted that the catalysts of examples 4 and S have performances which are a clear improvement over the prior art catalyst (comparative example 2).

In fact, the yields of light cracking products C4 obtained during the test of the two catalysts of examples 4 and 5 are very significantly lower than those observed for the catalyst of the comparative example 2.

Thus, it can be seen that the relation between the yields of cracking products C4 and the yields of aromatic compounds, called C4-/aromatics in the table above, is lower for the two

TABLE 3

| Catalyst | Proportion η alumina (weight % of matrix) | Specific surface area (m²/gm) | Platinum content (weight %) | Tin content (weight %) | Rhenium content (weight %) | Chlorine content (weight %) | Silicon content (weight %) | Potassium content (weight %) |
|---|---|---|---|---|---|---|---|---|
| Example 4 | 30 | 237 | 0.25 | 0 | 0.47 | 1.17 | 0.045 | 0.23 |
| Example 5 | 30 | 238 | 0.24 | 0 | 0.50 | 1.07 | 0.045 | 0.12 |
| Compar. Example 2 | 0 | 216 | 0.23 | 0 | 0.48 | 1.12 | 0 | 0 |
| Example 6 | 8 | 227 | 0.22 | 0.18 | 0 | 1.14 | 0.13 | 0.76 |
| Example 7 | 8 | 225 | 0.25 | 0.16 | 0 | 1.06 | 0.15 | 0.34 |
| Compar. Example 3 | 0 | 219 | 0.23 | 0.18 | 0 | 1.15 | 0 | 0 |

EXAMPLE 8

In this example, the catalysts of examples 4 and 5 and of the comparative example 2 are tested for conversion of a load of hydrocarbons with the following specifications:

| | |
|---|---|
| volume mass at 20° C. | 0.742 kg/dm³ |
| octane number required | ~41 |
| content of paraffins | 52.2% by weight |
| content of naphthenes | 32.4% by weight |
| content of aromatics | 15.4% by weight |

The following operating conditions are used:

| | |
|---|---|
| temperature | 500° C. |
| total pressure | 1.5 Mpa |
| mass flow of load | 2.0 kg/kg of catalyst and per hr. |
| duration | 100 hr. |

The performances of the catalysts are recorded in table 4 below, and are expressed in yields by weight and of the octane number required of the reformed product.

catalysts according to the invention. The selectivity of the catalysts vis-a-vis the aromatic products required become higher as this relation becomes lower.

The catalysts of examples 4 and 5 containing, in addition compared to the catalyst of example 2, λ alumina, silicon and potassium, show improved specifications relative to the catalyst of comparative example 2, notably as far as weaker selectivity of cracking products is concerned, and thus improved selectivity for aromatic products.

EXAMPLE 9

In this example, the catalysts of examples 6 and 7 and of the comparative example 3 are tested for conversion of a load of hydrocarbons with the following specifications:

| | |
|---|---|
| volume mass at 20° C. | 0.736 kg/dm³ |
| octane number-required | ~38 |
| content of paraffins | 54.8% by weight |
| content of naphthenes | 33.1% by weight |
| content of aromatics | 12.1% by weight |

The following operating conditions are used:

| | |
|---|---|
| temperature | 495° C. |
| total pressure | 0.75 Mpa |
| mass flow of load | 1.8 kg/kg of catalyst |
| duration | 100 hr. |

At the end of the functioning period, the deactivated catalyst is regenerated through controlled combustion of the coke and adjustment of its chlorine content to around 1.10% by weight. The specific surface area of the support is measured after this regeneration. Then after activation of the catalyst at high temperature by hydrogen, the load is injected for a new functioning period. Thus, each catalyst has been submitted to 5 cycles of operation-regeneration. The specific surface areas corresponding to the beginning of the first and last cycles and the performance obtained after 15 hours of operation for each of these two cycles are recorded in table 5 below.

TABLE 5

| Catalyst | cycle | Specific surface area ($m^2$/gm) | Yield of reformed product (weight %) | Octane number required | Aromatics yield (weight %) | C4 yield (weight %) |
|---|---|---|---|---|---|---|
| Example 6 | 1 | 227 | 91.2 | 97.9 | 68.2 | 5.5 |
| | 5 | 220 | 92.1 | 96.8 | 67.3 | 4.7 |
| Example 7 | 1 | 225 | 91.2 | 97.6 | 67.9 | 5.4 |
| | 5 | 213 | 91.5 | 96.5 | 66.5 | 5.3 |
| Comparative Example 3 | 1 | 219 | 90.7 | 97.5 | 67.2 | 6.0 |
| | 5 | 198 | 91.6 | 95.4 | 65.1 | 5.2 |

When comparing the performances of the catalysts of examples 6 and 7, with those of the prior art catalyst (comparative example 3), it can be seen that the catalysts of examples 6 and 7 show better yields in aromatics and better octane numbers for the reformed product. It can also be noted that these improvements are achieved without the yields of reformed product being affected.

If the evolution over 5 cycles is now considered, it can be seen that the fall in the specific surface areas of examples 6 and 7 is much less than that of the prior art catalyst. This smaller fall is accompanied by better maintenance of yields in aromatics and octane numbers.

EXAMPLE 10

This example illustrates the production of a catalyst comprising a matrix formed of a mixture of γ alumina and λ alumina, on which silicon, chlorine, lanthanum, rhenium and platinum are deposited.

a) Formation of the Matrix in Alumina

The alumina matrix is first prepared by mechanical mixing of a powder of γ alumina of specific surface area 220 $m^2$/gm and a powder of λ alumina of specific surface area equal to 320 $m^2$/gm which has been prepared by roasting of bayerite. The proportion of λ alumina is 40% by weight. This mixture is then formed by extrusion, and then roasted in a current of dry air at 520° C. for 3 hours b) Deposit of Silicon

After cooling down, silicon is deposited on the roasted matrix by putting it into contact with an ethanolic solution of tetraethyl orthosilicate $Si(OC_2H_5)_4$. The concentration of this solution is 2.5 gm of silicon per liter. This contact is made at ambient temperature with stirring, for 2 hours. The solvent is then evaporated under reduced pressure. Then the impregnated extrusions are dried at 120° C. for 15 hours, and roasted at 530° C. in a current of dry air for 2 hours.

c) Lanthanum Deposit

Then the extrusions are put into contact with an aqueous solution of lanthanum nitrate $La(No_3)_3$, $6H_2O$ containing 42 gm/l of lanthanum. This contact is carried out at ambient temperature for 2 hours, and then the impregnated matrix is dried at 120° C. for 15 hours and roasted at 530° C. in a current of dry air for 2 hours.

d) Deposit of Platinum and Chlorine

The platinum and part of the chlorine are then simultaneously deposited on this support through impregnation by a chlorinated aqueous solution containing per liter:

8.20 gm of chlorine in the form of HCl, and
1.00 gm of platinum in the form of $H_2PtCl_6$.

The solution is left in contact with the support for 2 hours. After centrifugation and drying for 4 hours at 120° C., the impregnated support is roasted at 530° C. for 3 hours in a current of dry air.

e) Deposit of Rhenium and Chlorine

The rhenium and the rest of the chlorine are then simultaneously deposited through impregnation by a chlorinated aqueous solution containing per liter:

4.20 gm of chlorine in the form of HCl, and
1.50 gm of rhenium in the form of $ReCl_3$.

After drying, the impregnated support is roasted at 530° C. for 2 hours in a current of dry air.

f) Hydrothermal Treatment

A hydrothermal treatment is then carried out in the presence of water and chlorine. To do so, the catalyst is treated at 510° C/ for 2 hours in a current of air of 2000 $dm^3$/hr for 1 kg of solid product. This air contains water and chlorine injected in a preheating zone situated upstream from the bed of solid. The molar concentrations in water and chlorine are equal to 1% and 0.05% respectively.

The specifications of the catalyst obtained are given in table 6.

EXAMPLE 11

The same operating mode as for example 10 are followed to prepare a catalyst comprising the same constituents, except that, in stage c), the impregnation solution contains 21 gm/l of lanthanum, and the hydrothermal treatment of stage f) is not applied.

The specifications of the catalyst obtained are also given in table 6.

EXAMPLE 12

This example illustrates the production of a catalyst comprising a matrix formed of γ alumina, on which silicon, chlorine, lanthanum, rhenium and platinum are deposited.

For this preparation, the same operating mode as for example 10 is followed, but stage f) is not carried out. Only γ alumina is- used in stage a) and stage b) is carried out in the same conditions as those of example 10, except for the concentration in silicon of the solution, which is 3.2 gm/l. Stages c), d) and e), are carried out as in example 10.

The specifications of the catalyst obtained are given in table 6.

EXAMPLE 13

The same operating mode as for example 12 is followed to prepare a catalyst comprising the same constituents, but a hydrothermal treatment is also applied in the same conditions as those in example 10 (stage f).

The chlorine content of the catalyst is 1.08% by weight.

COMPARATIVE EXAMPLE 4

In this example, the same operating mode as for example 10 is followed, but only γ alumina is used in stage a) and stages b) and c) for depositing silicon and lanthanum and stage f) for hydrothermal treatment are not applied.

The specifications of the catalyst obtained are also given in table 6.

The specifications of the catalyst obtained are also given in table 6.

COMPARATIVE EXAMPLE 5

In this example, the same operating mode as in example 14 is followed, but only γ alumina -is used in stage a), and stages b) and c) for depositing silicon and lanthanum and the last stage f) for hydrothermal treatment in the presence of water and chlorine of example 14 are not applied.

The specifications of the catalyst obtained are given in table 6.

TABLE 6

| Catalyst | Proportion η alumina (weight % of matrix) | Specific surface area (m²/gm) | Platinum content (weight %) | Tin content (weight %) | Rhenium content (weight %) | Chlorine content (weight %) | Silicon content (weight %) | Lanthanum content (weight %) |
|---|---|---|---|---|---|---|---|---|
| Example 10 | 40 | | 0.23 | 0 | 0.24 | 1.18 | 0.028 | 0.47 |
| Example 11 | 40 | | 0.22 | 0 | 0.24 | 1.09 | 0.028 | 0.11 |
| Example 12 | 0 | | 0.24 | 0.23 | 1.05 | 0.035 | 0.43 | |
| Compar. Example 4 | 0 | | 0.23 | 0 | 0.25 | 1.12 | 0 | 0 |
| Example 14 | 12 | 229 | 0.24 | 0.16 | 0 | 1.13 | 0.11 | 1.70 |
| Example 15 | 12 | 231 | 0.24 | 0.16 | 0 | 1.08 | 0.13 | 0.82 |
| Compar. Example 5 | 0 | 219 | 0.25 | 0.18 | 0 | 1.15 | 0 | 0 |

EXAMPLE 14

This example illustrates the production of a catalyst comprising a matrix formed from a mixture of γ alumina and λ alumina comprising 12% λ alumina, on which silicon, chlorine, lanthanum, tin and platinum are deposited.

For this preparation, the same operating mode as in example 10 is followed, utilizing in stage a) 12% by weight of λ=0 alumina and carrying out, instead of stages d) and e), a single simultaneous deposit stage of platinum, tin and chlorine through impregnation with a chlorinated aqueous solution containing per liter:

0.81 gm of platinum in the form $H_2PtCl_6$, and 0.96 gm of tin in the form $SnCl_2$.

The solution is left in contact with the support for 2 hours. After centrifugation and drying for 4 hours at 120° C., the impregnated support is roasted at 530° C for 3 hours in a current of dry air.

A hydrothermal treatment is then carried out in the presence of water and chlorine as in stage f) of example 10, but at 500° C. with molar concentrations in water and chlorine respectively of 1.5% and 0.02%.

The specifications of the catalyst obtained are given in table 6.

EXAMPLE 15

The same operating mode as in example 14 is followed to prepare a catalyst comprising the same constituents, apart from the fact, that in stage c), the impregnation solution contains 21 gm/l of lanthanum, and the final hydrothermal treatment of stage f) in the presence of water and chlorine is not carried out.

EXAMPLE 16

In this example, the catalysts of examples 10 and 13 and of the comparative example 4 are tested for conversion of a load of hydrocarbons with the following specifications:

| | |
|---|---|
| volume mass at 20° C. | 0.742 kg/dm³ |
| octane number required | ~41 |
| content of paraffins | 52.2% by weight |
| content of naphthenes | 32.4% by weight |
| content of aromatics | 15.4% by weight |

The following operating conditions are used:

| | |
|---|---|
| temperature | 490° C. |
| total pressure | 1.4 Mpa |
| mass flow of load | 3.0 kg/kg of catalyst and per hr. |

The performances of the catalysts are recorded in table 7 below, and are expressed in yields by weight and of the octane number required of the reformed product.

TABLE 7

| Catalyst | Yield of reformed product (weight %) | Hydrogen yield (weight %) | Aromatics yield (weight %) | C4 yield (weight %) | C4 aromatics |
|---|---|---|---|---|---|
| Example 10 | 86.0 | 3.2 | 58.9 | 10.8 | 0.18 |
| Example 11 | 85.2 | 3.2 | 59.2 | 11.6 | 0.20 |
| Example 12 | 84.8 | 3.1 | 58.7 | 12.1 | 0.20 |
| Example 13 | 85.7 | 3.2 | 58.8 | 11.1 | 0.19 |
| Comparative example 4 | 84.4 | 3.0 | 58.4 | 12.6 | 0.22 |

When comparing the performances of the catalysts of example 10 and the comparative example 4 on the one hand, and those or the catalysts of example 11 and of the comparative example 4 on the other, it is noted that the catalysts of examples 10 and 11 have performances which are a -clear improvement over the catalyst of prior art (comparative example 4).

In fact, the yields of light cracking products C4 obtained during the test of the two catalysts of examples 10 and 11 are very significantly lower than those observed for the catalyst of the comparative example 4.

Thus, it can be seen that the relation between the yields of cracking products C4 and the yields of aromatic compounds, called C4-/aromatics in the table above, is lower for the two catalysts according to the invention. The selectivity of the catalysts vis-à-vis the aromatic products required will become higher as this relation is lowered The catalysts of examples 10 and 11 containing, in addition compared to the catalyst of comparative example 4, λ alumina, silicon and lanthanum, present improved specifications relative to the catalyst of comparative example 4, notably as far as weaker selectivity of cracking products is concerned, and thus improved selectivity for aromatic products.

When comparing the performances of the catalysts of examples 12 and 13, it is noted that the catalyst of example 13 presents improved performance compared with the catalyst of example 12.

In fact, the catalyst of example 13 presents a yield in cracking products C4- which is clearly lower and a yield in aromatics which is evidently higher. The relation between yields in cracking products C4— and the yields of aromatic compounds, called C4-/aromatics in the table above, is lower for the catalyst of example 13. The selectivity of the catalysts vis-a-vis the aromatic products required will become higher as this relation is lowered.

The catalysts of examples 12 and 13 contain, among others, silicon and lanthanum. The catalyst of example 13 has, in addition, been submitted to a hydrothermal treatment. It presents improved specifications relative to the catalyst of example 12, notably as far as weaker selectivity of- cracking products is concerned, and thus improved selectivity for aromatic products.

EXAMPLE 17

In this example, the catalysts of examples 14 and 15 and the comparative example 5 are tested for conversion of a load of hydrocarbons with the following specifications:

| | |
|---|---|
| volume mass at 20° C. | 0.736 kg/dm$^3$ |
| octane number required | ~38 |
| content of paraffins | 54.8% by weight |
| content of naphthenes | 33.1% by weight |
| content of aromatics | 12.1% by weight |

The following operating conditions are used:

| | |
|---|---|
| temperature | 500° C. |
| total pressure | 0.40 Mpa |
| mass flow of load | 2.0 kg/kg of catalyst |
| duration | 100 hr. |

At the end of the functioning period, the deactivated catalyst is regenerated through controlled combustion of the coke and adjustment of its chlorine content to around 1.10% by weight. The specific surface area of the support is measured after this regeneration. Then after activation of the catalyst at high temperature by hydrogen, the load is injected for a new functioning period. Thus, each catalyst has been submitted to 5 cycles of operation-regeneration. The specific surface areas corresponding to the beginning of the first and last cycles and the performances obtained after 15 hours of functioning for each of these two cycles are recorded in table 8 below.

TABLE 8

| Catalyst | cycle | Specific surface area (m$^2$/gm) | Yield of reformed product (weight %) | Octane number required | Aromatics yield (weight %) | C4 yield (weight %) |
|---|---|---|---|---|---|---|
| Example 14 | 1 | 229 | 90.0 | 101.0 | 71.7 | 6.5 |
| | 5 | 224 | 90.8 | 100.1 | 71.1 | 5.7 |
| Example 15 | 1 | 231 | 89.2 | 101.4 | 71.8 | 7.2 |
| | 5 | 222 | 90.2 | 100.3 | 70.8 | 6.4 |
| Comparative Example 5 | 1 | 219 | 88.2 | 100.9 | 70.S | 8.5 |
| | 5 | 194 | 89.4 | 98.6 | 67.8 | 7.5 |

When comparing the performances of the catalysts of examples 14 and is, with those of the prior art catalyst (comparative example 5), it can be seen that the catalysts of examples 14 and 15 show better yields in aromatics and better octane numbers for the reformed product. It can also be noted that these improvements are achieved without the yields of reformed product being affected.

If the evolution over 5 cycles is now considered, it can be seen that the fall in the specific surface areas of examples 14 and 15 is much less than that of the prior art catalyst. This smaller fall is accompanied by better maintenance of yields in aromatics and octane numbers.

EXAMPLE 18

This example illustrates the production of a catalyst comprising a matrix formed of a mixture of γ alumina and n alumina, on which silicon, chlorine, zirconium, rhenium and platinum are deposited.

a) Formation of the Matrix in Alumina

The alumina matrix is first prepared by mechanical mixing of a powder of γ alumina of specific surface area 220 m$^2$/gm and a powder or λ alumina of specific surface area equal to 320 m$^2$/gm which has been prepared by roasting of bayerite. The proportion of λ alumina is 20% by weight. This mixture is then formed by extrusion, and then roasted in a current of dry air at 520° C. for 3 hours.

b) Deposit of Silicon

After cooling down, silicon is deposited on the roasted matrix by putting it into contact with an ethanolic solution of tetraethyl orthosilicate $Si(OC_2H_5)_4$. The concentration of this solution is 2.5 gm of silicon per liter. This contact is made at ambient temperature with stirring, for 2 hours. The solvent is then evaporated under reduced pressure. Then the impregnated extrusions are dried at 120° C. for 15 hours, and roasted at 530° C. in a current of dry air for 2 hours.

c) Zirconium Deposit

Then the extrusions are put into contact with an aqueous solution of zirconyl chloride $ZrOCl_2, 8H_2O$ containing 26.7 gm/l of zirconium. This contact is carried out at ambient temperature for 2 hours, and then the impregnated matrix is dried at 120° C. for 15 hours and roasted at 530° C. in a current of dry air for 2 hours.

d) Deposit of Platinum and Chlorine

The platinum and part of the chlorine are then simultaneously deposited on this support through impregnation by a chlorinated aqueous solution containing per liter:

8.20 gm of chlorine in the form of HCl, and 1.00 gm of platinum in the form of $H_2PtCl_6$.

The solution is left in contact with the support for 2 hours. After centrifugation and drying for 4 hours at 120° C., the impregnated support is roasted at 530° C. for 3 hours in a current of dry air.

e) Deposit of Rhenium and Chlorine

The rhenium and the rest of the chlorine are then simultaneously deposited through impregnation by a chlorinated aqueous solution containing per liter:

4.20 gm of chlorine in the form of HCl, and 1.50 gm of rhenium in the form of $ReCl_3$.

After drying, the impregnated support is roasted at 530° C. for 2 hours in a-current of dry air.

f) Hydrothermal Treatment

A hydrothermal treatment is then carried out in the presence of water and chlorine. For this, the catalyst is treated at 510° C. for 2 hours in a current of 2000 dm³/hr of air for 1 kg of solid product. This air contains water and chlorine injected in a preheating zone situated upstream from the bed of solid. The molar concentrations in water and chlorine are equal to 1% and 0.05% respectively.

The specifications of the catalyst obtained are given in table 9.

EXAMPLE 19

The same operating mode as for example 18 is followed to prepare a catalyst comprising the same constituents, except that in stage c), the impregnation solution contains 13.3 gm/l of zirconium, and the hydrothermal treatment of stage f) is not applied.

The specifications of the catalyst obtained are also given in table 9.

COMPARATIVE EXAMPLE 6

In this example, the same operating mode as in example 18 is followed, but only γ alumina is used in stage a), and stages b) and c) for depositing silicon and zirconium and stage f) for hydrothermal treatment are not applied.

The specifications of the catalyst obtained are also given in table 9.

EXAMPLE 20

This example illustrates the production of a catalyst comprising a matrix formed of a mixture of γ alumina and λ alumina, comprising 8% of λ alumina, on s which silicon, chlorine, zirconium, tin and platinum are deposited.

For this preparation, the same operating mode as for example 18 is followed, using 8% by weight of λ alumina in stage a) and carrying out, instead of stages d) and e), a single stage of simultaneous deposit of platinum, tin, and chlorine through impregnation with a chlorinated aqueous solution containing per liter:

0.81 gm of platinum in the form $H_2PtCl_6$, and 0.96gm of tin in the form $SnCl_2$.

The solution is left in contact with the support for 2 hours. After centrifugation and drying for 4 hours at 120° C., the impregnated supDort is roasted at 530° C. for 3 hours in a current of dry air.

A hydrothermal treatment is then carried out in the presence of water and chlorine as in stage f) of example 18.

The specifications of the catalyst obtained are given in table 9.

EXAMPLE 21

The same operating mode as for example 20 is followed to prepare a catalyst comprising the same constituents, but in stage c), the impregnation solution contains 13.3 gm/l of zirconium, and the final hydrothermal treatment in the presence of water and chlorine is not carried out.

The-specifications of the catalyst obtained are also given in table 9.

COMPARATIVE EXAMPLE 7

In this example, the same operating mode as for example 20 is followed, but only γ alumina is used in stage a) and stages b) and c) for depositing silicon and zirconium and the last stage f) for hydrothermal treatment in the presence of water and chlorine one does not carried out.

The specifications of the catalyst obtained are also given in table 9.

TABLE 9

| Catalyst | Proportion η alumina (weight % of matrix) | Specific surface area (m²/gm) | Platinum content (weight %) | Tin content (weight %) | Rhenium content (weight %) | Chlorine content (weight %) | Silicon content (weight %) | Zirconium content (weight %) |
|---|---|---|---|---|---|---|---|---|
| Example 18 | 20 | | 0.24 | 0 | 0.26 | 1.16 | 0.032 | 0.51 |
| Example 19 | 20 | | 0.23 | 0 | 0.23 | 1.05 | 0.032 | 0.15 |
| Compar. Example 6 | 0 | | 0.23 | 0 | 0.25 | 1.12 | 0 | 0 |
| Example 20 | 8 | 223 | 0.22 | 0.17 | 0 | 1.12 | 0.12 | 1.72 |
| Example 21 | 8 | 226 | 0.25 | 0.15 | 0 | 1.05 | 0.14 | 0.85 |
| Compar. Example 7 | 0 | 219 | 0.24 | 0.18 | 0 | 1.15 | 0 | 0 |

EXAMPLE 22

In this example, the catalysts of examples 18 and 19 and of the comparative example 6 are tested for conversion of a load of hydrocarbons with the following specifications:

| | |
|---|---|
| volume mass at 20° C. | 0.742 kg/dm³ |
| octane number required | ~41 |
| content of paraffins | 52.2% by weight |
| content of naphthenes | 32.4% by weight |
| content of aromatics | 15.4% by weight |

The following operating conditions are used:

| | |
|---|---|
| temperature | 505° C. |
| total pressure | 1.3 Mpa |
| mass flow of load | 4.0 kg/kg of catalyst and per hr. |
| duration | 100 hr. |

The performances of the catalysts are recorded in table 10 below, and are expressed in yields by weight and of the octane number required of the reformed product.

TABLE 10

| Catalyst | Yield of reformed product (weight %) | Hydrogen yield (weight %) | Aromatics yield (weight %) | C4 yield (weight %) | C4 aromatics |
|---|---|---|---|---|---|
| Example 18 | 86.0 | 3.2 | 60.4 | 10.8 | 0.18 |
| Example 19 | 85.2 | 3.2 | 61.1 | 11.5 | 0.19 |
| Comparative example 6 | 84.4 | 3.0 | 59.8 | 12.8 | 0.21 |

When comparing the performances of the catalysts of example 18 and of the comparative example 6 on the one hand, and those of the catalysts of example 19 and of the comparative example 6 on the other, it is noted that the catalysts of examples 18 and 19 have performances which are a clear improvement over the catalyst of prior art (comparative example 6).

In fact, the yields of light cracking products C4 obtained during the test of the two catalysts of examples 18 and 19 are very significantly lower than those observed for the catalyst of the comparative example 6.

Thus, it can be seen that the relation between the yields of cracking products C4 and the yields of aromatic compounds, called C4/aromatics in the table above, is lower for the two catalysts of examples 18 and 19. The selectivity of the catalysts vis-à-vis the aromatic products required will become higher as this relation is lowered.

The catalysts of examples 18 and 19 containing, in addition to the catalyst of comparative example 6, λ alumina, silicon and zirconium, present improved specifications relative to the catalyst of comparative example 6, notably as far as weaker selectivity of cracking products is concerned, and thus improved selectivity for aromatic products.

EXAMPLE 23

In this example, the catalysts of examples 20 and 21 and of the comparative example 7 are tested for conversion of a load of hydrocarbons with the following specifications:

| | |
|---|---|
| volume mass at 20° C. | 0.742 kg/dm³ |
| octane number required | ~41 |
| content of paraffins | 44.2% by weight |
| content of naphthenes | 39.4% by weight |
| content of aromatics | 16.4% by weight |

The following operating conditions are used:

| | |
|---|---|
| temperature | 505° C. |
| total pressure | 0.75 Mpa |
| mass flow of load | 2.5 kg/kg of catalyst |
| duration | 100 hr. |

At the end of the functioning period, the deactivated catalyst is regenerated through controlled combustion of the coke and adjustment of its chlorine content to around 1.10% by weight. The specific surface area of the support is measured after this regeneration. Then, after activation of the catalyst at high temperature by hydrogen, the load is injected for a new functioning period. Thus, each catalyst has been submitted to 5 cycles of operation-regeneration. The specific surface areas corresponding to the beginning of the first and last cycles and the performances obtained after 15 hours of functioning for each of these two cycles are recorded in table 11 below.

TABLE 11

| Catalyst | cycle | Specific surface area (m²/gm) | Yield of reformed product (weight %) | Octane number required | Aromatics yield (weight %) | C4 (weight %) |
|---|---|---|---|---|---|---|
| Example 20 | 1 | 223 | 89.7 | 102.1 | 73.3 | 6.6 |
|  | 5 | 212 | 90.7 | 100.7 | 71.9 | 5.8 |
| Example 21 | 1 | 226 | 90.4 | 101.9 | 73.6 | 5.9 |
|  | 5 | 209 | 90.7 | 100.5 | 71.6 | 5.7 |
| Comparative Example 7 | 1 | 219 | 89.2 | 102.0 | 72.8 | 7.3 |
|  | 5 | 196 | 90.2 | 100.2 | 70.7 | 6.4 |

When comparing the performances of the catalysts of examples 20 and 21, with those of the prior art catalyst (comparative example 7), it can be seen that the catalysts of examples 20 and 21 present better yields in aromatics and better octane numbers for the reformed product. It can also be noted that these improvements are achieved without the yields of reformed product being affected.

If the evolution over 5 cycles is now considered, it can be seen that the fall in the specific surface areas of examples 20 and 21 is much is less than that of the prior art catalyst. This smaller fall is accompanied by better maintenance of yields in aromatics and octane numbers.

The process of the invention thus makes it possible to improve substantially the results obtained by the conversion of hydrocarbons into aromatic components, in terms of selectivity and stability during the reaction cycles.

What is claimed is:

1. A process for preparing a catalyst, which comprises:
(a) extruding a matrix of a mixture of λ transition alumina and γ transition alumina;
(b) depositing the following constituents on at least one of the λ and γ transition aluminas, wherein the percentages by weight are given are based on the total weight of the catalyst;
from 0.01 to 2% by weight of silicon,
from 0.1 to 15% by weight of at least one halogen selected from the group consisting of fluorine, chlorine, bromine and iodine,
from 0.01 to 2% of at least noble metal selected from the platinum group,
from 0.005 to 10% by weight of at least one promoter metal selected from the group consisting of tin, germanium, indium, gallium, thallium, antimony, lead, rhenium, manganese, chromium, molybdenum and tungsten, and
optionally, from 0.001 to 10% by weight of at least one doping metal selected from the group consisting of alkali metal, alkaline earth metals, lanthanide series metals, titanium, zirconium, hafnium, cobalt, nickel and zinc; and
(c) hydrothermally treating the catalyst obtained after steps (a) and (b) at a temperature of from 300 to 1000° C. in a gaseous atmosphere containing water vapor, wherein the molar content of water in the gaseous atmosphere is at least 0.05%; and
wherein step (b) is prior to step (a); and wherein the catalyst, comprises:
a matrix consisting of from about 1 to 99% by weight of λ transition alumina, the complement, up to 100% by weight of the matrix, being γ transition alumina; and, based on the total weight of the catalyst:
from 0.01 to 2% by weight of silicon, from 0.1 to 15% by weight of at least one halogen selected from the group consisting of fluorine, chlorine, bromine and iodine;
from 0.01 to 2.00% by weight of at least one noble metal selected from the platinum group,
from 0.005 to 10% by weight of at least one promoter metal selected from the group consisting of tin, germanium, indium, gallium, thallium, antimony, lead, rhenium, manganese, chromium, molybdenum and tungsten, and
optionally, from 0.001 to 10% by weight of at least one doping metal selected from the group consisting of alkali metal, alkaline earth metals, lanthanide series metals, titanium, zirconium, hafnium, cobalt, nickel and zinc,
said catalyst having been hydrothermally treated at a temperature of 300 to 1000° C. in a gaseous atmosphere containing water vapor, wherein the molar content of water in the gaseous atmosphere is at least 0.05%.

2. The process according to claim 1, wherein the depositing step (b) is carried out by impregnation using at least one solution containing at least one precursor compound of a constituent to be deposited, followed by calcination at a temperature of from 300° to 900° C.

3. The process according to claim 1, comprising the following successive stages:
(a) extruding the matrix of said mixture of γ alumina and Ti alumina;
($b_1$) depositing the silicon on the matrix;
($b_2$) optionally, depositing said at least one doping metal;
($b_3$) simultaneous or successive depositing of:
at least one promoter metal selected from the group consisting of tin, germanium, indium, gallium, thallium, antimony, lead, rhenium, manganese, chromium, molybdenum and tungsten,
at least one element selected from the group consisting of fluorine, chlorine, bromine and iodine, and
at least one noble metal selected from the platinum group; and
step (c); and
wherein each of steps ($b_1$), ($b_2$) or ($b_3$) is before step (a).

4. The process according to claim 1, wherein the hydrothermal treatment of step c) is carried out for a period of 1 minute to 30 hours under a gaseous atmosphere having a molar water content of 0.05 to 100%.

5. The process according to claim 4, wherein the molar content is 1 to 50%.

6. The process according to claim 4, wherein the duration of hydrothermal treatment is from 1 to 10 hours.

7. The process according to claim 1, wherein the gaseous atmosphere is air, oxygen, argon or nitrogen.

8. The process according to claim 7, wherein the gaseous atmosphere further comprises at least one halogen.

9. The process according to claim 8, wherein the halogen content of the gaseous mixture is at most 20 molar %.

10. The process according to claim 9, wherein the halogen content of the gaseous mixture is at most 10 molar %.

11. The process according to claim 10, wherein the halogen content of the gaseous mixture is at most 2 molar %.

12. A process for preparing a catalyst, which comprises:
(a) extruding a matrix of a mixture of λ transition alumina and γ transition alumina;
(b) depositing the following constituents on at least one of the λ and γ transition aluminas, wherein the percentages by weight given are based on the total weight of the catalyst:
from 0.01 to 2% by weight of silicon,
from 0.1 to 15% by weight of at least one halogen selected from the group consisting of fluorine, chlorine, bromine and iodine, from 0.01 to 2% of at least noble metal selected from the platinum group, from 0.005 to 10% by weight of at least one promoter metal selected from the group consisting of tin, germanium, indium, gallium, thallium, antimony, lead, rhenium, manganese, chromium, molybdenum and tungsten, and optionally, from 0.001 to 10% by weight of at least one doping metal selected from the group consisting of alkali metal, alkaline earth metals, lanthanide series metals, titanium, zirconium, hafnium, cobalt, nickel and zinc; and (c) hydrothermally treating the catalyst obtained after steps (a) and (b) at a temperature of from 300 to 1000° C. in a gaseous atmosphere containing water vapor, wherein the molar content of water in the gaseous atmosphere is at least 0.05%;

wherein a portion of the constituents are deposited prior to step (a) and the remaining constituents are deposited after step (a); and wherein the catalyst, comprises:

a matrix consisting of from about 1 to 99% by weight of $\lambda$ transition alumina, the complement, up to 100% by weight of the matrix, being $\gamma$ transition alumina; and, based on the total weight of catalyst:

from 0.01 to 2% by weight of silicon, from 0.1 to 15% by weight of at least one halogen selected from the group consisting of fluorine, chlorine, bromine and iodine, from 0.01 to 2.00% by weight of at least one noble metal selected from the platinum group, and from 0.005 to 10% by weight of at least one promoter metal selected from the group consisting of tin, germanium, indium, gallium, thallium, antimony, lead, rhenium, manganese, chromium, molybdenum and tungsten, and optionally, from 0.001 to 10% by weight of at least are doping metal selected from the group consisting of alkali metal, alkaline earth metals, lanthanide series metals, titanium, zirconium, hafnium, cobalt, nickel and zinc, said catalyst having been hydrothermally treated at a temperature of 300 to 1000° C. in a gaseous atmosphere containing water vapor, wherein the molar content of water in the gaseous atmosphere is at least 0.05%.

13. The process according to claim 12, wherein the depositing step b) is carried out by impregnation using at least one solution containing at least one precursor compound of a constituent to be deposited, followed by calcination at a temperature of from 300° to 900° C.

14. The process according to claim 12, comprising the following successive stages:

(a) extruding the matrix of said mixture of $\gamma$ alumina and $\lambda$ alumina;

(b$_1$) depositing the silicon on the matrix;

(b$_2$) optionally, depositing said at least one doping metal;

(b$_3$) simultaneous or successive depositing of:

at least one promoter metal selected from the group consisting of tin, germanium, indium, gallium, thallium, antimony, lead, rhenium, manganese, chromium, molybdenum and tungsten, at least one element selected from the group consisting of fluorine, chlorine, bromine and iodine, and at least one noble metal selected from the platinum group; and step (c).

15. The process according to claim 12, wherein the hydrothermal treatment is carried out for a period of 1 minute to 30 hours under a gaseous atmosphere having a molar water content of 0.05 to 100%.

16. The process according to claim 15, wherein the molar content is 1 to 50%.

17. The process according to claim 15, wherein the duration of hydrothermal treatment is from 1 to 10 hours.

18. The process according to claim 12, wherein the gaseous atmosphere is air, oxygen, argon or nitrogen.

19. The process according to claim 18, wherein the gaseous atmosphere further comprises at least one halogen.

20. The process according to claim 19, wherein the halogen content of the gaseous mixture is at most 20 molar %.

21. The process according to claim 20, wherein the halogen content of the gaseous mixture is at most 10 molar %.

22. The process according to claim 21, wherein the halogen content of the gaseous mixture is at most 2 molar %.

23. A process for preparing a catalyst, which comprises:

(a) extruding a matrix of a mixture of $\lambda$ transition alumina and $\gamma$ transition alumina;

(b) depositing the following constituents on at least one of the $\lambda$ and $\gamma$ transition aluminas, wherein the percentages by weight given are based on the total weight of the catalyst:

from 0.01 to 2% by weight of silicon, from 0.1 to 15% by weight of at least one halogen selected from the group consisting of fluorine, chlorine, bromine and iodine, from 0.01 to 2% of at least noble metal selected from the platinum group, from 0.005 to 10% by weight of at least one promoter metal selected from the group consisting of tin, germanium, indium, gallium, thallium, antimony, lead, rhenium, manganese, chromium, molybdenum and tungsten, and optionally, from 0.001 to 10% by weight of at least one doping metal selected from the group consisting of alkali metal, alkaline earth metals, lanthanide series metals, titanium, zirconium, hafnium, cobalt, nickel and zinc; and (c) hydrothermally treating the catalyst obtained after steps (a) and (b) at a temperature of from 300 to 1000° C. in a gaseous atmosphere containing water vapor, wherein the molar content of water in the gaseous atmosphere is at least 0.05%;

wherein the gaseous atmosphere further comprises at least one halogen;

and wherein the catalyst comprises:

a matrix consisting of from about 1 to 99% by weight of $\lambda$ transition alumina, the complement, up to 100% by weight of the matrix, being $\gamma$ transition alumina; and, based on the total weight of catalyst:

from 0.01 to 2% by weight of silicon, from 0.1 to 15% by weight of at least one halogen selected from the group consisting of fluorine, chlorine, bromine and iodine, from 0.01 to 2.00% by weight of at least one noble metal selected from the platinum group, and from 0.005 to 10% by weight of at least one promoter metal selected from the group consisting of tin, germanium, indium, gallium, thallium, antimony, lead, rhenium, manganese, chromium, molybdenum and tungsten, said catalyst having been hydrothermally treated at a temperature of 300 to 1000° C. in a gaseous atmosphere containing water vapor, wherein the molar content of water in the gaseous atmosphere is at least 0.05%.

24. The process according to claim 23, wherein the depositions are carried out by impregnation using at least one solution containing at least one precursor compound of a constituent to be deposited, followed by calcination at a temperature of from 300° to 900° C.

25. The process according to claim 23, comprising the following successive stages:
(a) extruding the matrix of said mixture of γ alumina and TI alumina;
($b_1$) depositing the silicon on the matrix;
($b_2$) optionally, depositing said at least one doping metal;
(b3) simultaneous or successive depositing of:
at least one promoter metal selected from the group consisting of tin, germanium, indium, gallium, thallium, antimony, lead, rhenium, manganese, chromium, molybdenum and tungsten,
at least one element selected from the group consisting of fluorine, chlorine, bromine and iodine, and
at least one noble metal selected from the platinum group; and
step (c).

26. The process according to claim 23, wherein the hydrothermal treatment is carried out for a period of 1 minute to 30 hours under a gaseous atmosphere having a molar water content of 0.05 to 100%.

27. The process according to claim 26, wherein the molar content is 1 to 50%.

28. The process according to claim 26, wherein the duration of hydrothermal treatment is from 1 to 10 hours.

29. The process according to claim 23, wherein the halogen content of the gaseous atmosphere is at most 20 molar %.

30. The process according to claim 29, wherein the halogen content of the gaseous atmosphere is at most 10 molar %.

31. The process according to claim 30, wherein the halogen content of the gaseous atmosphere is at most 2 molar %.

32. The process according to claim 23, wherein the catalyst matrix contains from 3.0 to 70% by weight of the λ transition alumina.

33. The process according to claim 23, wherein the catalyst contains from 0.001 to 8% by weight, based on the total weight of the catalyst, of at least one doping metal selected from the group consisting of alkali metals and alkaline earth metals.

34. The process according to claim 33, wherein the doping metal is potassium.

35. The process according to claim 23, containing from 0.01 to 10% by weight based on the total weight of the catalyst, of at least one doping metal selected from the group consisting of titanium, zirconium, hafnium, cobalt, nickel and zinc.

36. The process according to claim 23, wherein the doping metal is zirconium.

37. The process according to claim 23, further comprising, from 0.001 to 10% by weight, based on the total weight of the catalyst, of at least one doping metal selected from the lanthanide metals.

38. The process according to claim 37, wherein the doping metal is lanthanum.

39. The process according to claim 23, wherein the silicon content is from 0.01 to 1% by weight.

40. The process according to claim 23, wherein the halogen content is from 0.2 to 10% by weight.

41. The process according to claim 23, wherein the total content of the noble metal is from 0.1 to 0.8% by weight.

42. The process according to claim 23, wherein the promoter is selected from the group consisting of tin, germanium, indium, antimony, lead, thallium, and gallium.

43. The process according to claim 23, wherein the promoter metal is selected from the group consisting of rhenium, manganese, chromium, molybdenum, tungsten, indium and thallium.

44. The process according to claim 42, wherein the promoter metal is tin.

45. The process according to claim 23, wherein the halogen is chlorine.

46. The process according to claim 23, wherein the noble metal is platinum.

47. The process according to claim 23, wherein step (a) is prior to step (b).

48. The process according to claim 23, wherein step (b) is prior to step (a).

49. The process according to claim 23, wherein a portion of said constituents are deposited prior to step (a) and the remaining constituents are deposited after step (a).

50. The process according to claim 23, wherein the depositions are carried out by impregnation using at least one solution containing at least one precursor compound of a constituent to be deposited, followed by calcination at a temperature of from 300° to 900° C.

51. The process according to claim 23, comprising the following successive stages:
(a) extruding the matrix of said mixture of γ alumina and λ alumina;
($b_1$) depositing the silicon on the matrix;
($b_2$) optionally, depositing said at least one doping metal;
(b3) simultaneous or successive depositing of:
at least one promoter metal selected from the group consisting of tin, germanium, indium, gallium, thallium, antimony, lead, rhenium, manganese, chromium, molybdenum and tungsten,
at least one selected from the group consisting of fluorine, chlorine, bromine and iodine, and
at least one noble metal selected from the platinum group; and
step (c).

52. The process according to claim 23, wherein the hydrothermal treatment is carried out for a period of 1 minute and 30 hours under a gaseous atmosphere having a molar water content of 0.05 to 100%.

53. The process according to claim 52, wherein the molar content is 1 to 50%.

54. The process according to claim 52, wherein the duration of hydrothermal treatment is from 1 to 10 hours.

55. The process according to claim 23, wherein the gaseous atmosphere further comprises at least one halogen.

* * * * *